United States Patent
Nightingale et al.

(10) Patent No.: US 6,546,238 B1
(45) Date of Patent: Apr. 8, 2003

(54) CALLING PARTY PAYS SYSTEM BYPASS

(75) Inventors: John Nightingale, Jamesburg, NJ (US); Thomas Theohary, Lowell, MA (US)

(73) Assignee: Bell Atlantic Mobile, Inc., Bedminster, NJ (US)

( * ) Notice: Subject to any disclaimer, the term of this patent is extended or adjusted under 35 U.S.C. 154(b) by 0 days.

(21) Appl. No.: 09/467,145

(22) Filed: Dec. 20, 1999

(51) Int. Cl.[7] .................................................. H04Q 7/00
(52) U.S. Cl. ................. 455/406; 455/408; 379/114.21; 379/114.23; 379/114.26; 379/114.28
(58) Field of Search ....................... 379/114.05, 114.23, 379/114.26, 114.28, 114.29; 455/404, 405, 406, 407, 408

(56) References Cited

U.S. PATENT DOCUMENTS

| | | | | |
|---|---|---|---|---|
| 5,353,331 A | * | 10/1994 | Emery et al. | 379/221.08 |
| 5,473,667 A | * | 12/1995 | Neustein | 340/7.29 |
| 5,557,664 A | * | 9/1996 | Burns et al. | 379/111 |
| 5,579,379 A | * | 11/1996 | D'Amico et al. | 379/111 |
| 6,263,056 B1 | * | 7/2001 | Gruchala et al. | 379/114.01 |
| 6,345,182 B1 | * | 2/2002 | Fabritius et al. | 455/408 |

* cited by examiner

Primary Examiner—Thanh Cong Le
Assistant Examiner—Tsuleun R. Lei
(74) Attorney, Agent, or Firm—McDermott, Will & Emery

(57) ABSTRACT

Landline facilities are linked to a wireless mobile network for calling party pays (CPP) calls to mobile stations. In response to placement of a telephone call to a CPP subscriber station, a land line network data base is accessed to obtain a call processing record for the called station that is indicative that the called station subscribes to CPP service. Based on the call processing record, a determination is made as to whether the call is be accorded exception status from CPP service. If the call is to receive such exception status, a signaling message is transmitted to the mobile switching center (MSC) for the called subscriber station. The signaling message includes the calling station telephone number in altered form. The MSC, upon detection of the altered telephone number, effectively recognizes the call as a normal call. The MSC will complete the call to the called party and establish in the called party subscriber's billing record assessment of air time charges for the call to the called party. If the called mobile station is in the vicinity of a "visiting" MSC, the latter will receive the signaling message as relayed from the subscriber's MSC. If the call is not entitled to CPP exception status, the telephone number of the calling party will not be altered in the signaling message.

21 Claims, 3 Drawing Sheets

CALLING PARTY PAYS SYSTEM BYPASS

RELATED APPLICATION

This application contains subject matter that is related to subject matter disclosed in U.S. patent application Ser. No. 9/456,550, filed Dec. 8, 1999 and issued on Jun. 11, 2002 as U.S. Pat. No. 6,405,028 entitled "Inetwork Architecture for Calling Party Pays Wireless Service"; and in U.S. patent application Ser. No. 09/467,144, filed Dec. 20, 1999 and issued on May 28, 2002 as U.S. Pat. No. 6,397,055 entitled "Mobile to Mobile Call Delivery for Calling Party Pays Wireless Service".

FIELD OF THE INVENTION

The present invention relates to an enhanced network architecture for providing Calling-Party-Pays (hereinafter CPP) billing services for customers of a wireless telephone network, such as cellular or personal communication service (PCS) customers. More particularly, the invention relates to the call processing of calls that are to be excluded from CPP status.

BACKGROUND

Wireless telephone communication systems have evolved from the initially introduced Advanced Mobile Phone Service (AMPS) technology to more sophisticated digital-based air interface protocols. Digital access technologies have been developed based on Time Division Multiple Access (TDMA) or Code Division Multiple Access (CDMA) schemes. Although these digital access technologies have advantages with respect to analog-based systems, they have not yet been deployed in as many regions as AMPS-based systems. However, digital cellular subscribers in many areas presently are offered continuous coverage via dual-mode wireless telephones capable of switching between a digital mode (e.g., CDMA) and an analog mode (e.g., AMPS).

Ordinarily, charges for wireless services air-time charges are applied to the party subscribing to the wireless service. The wireless carrier bills, either directly or through the local exchange carrier, a monthly subscription fee plus per-minute fees for telephone communications over-the-air to and from each subscriber's telephone. A wireless subscriber is charged for the air-time, both on outgoing calls and on incoming calls directed to the subscriber's cellular or PCS telephone. In contrast, call charges for landline telephone service usually are billed to the subscriber associated with the calling station. Alternative landline billing arrangements are available for collect call billing or 800/888 type "toll-free" calling.

The costs for wireless air-time has tended to be high, compared to costs for traditional landline telephone services. In light of high costs and the fact that charges are incurred for air-time on incoming calls, many wireless subscribers have been reluctant to distribute widely their wireless telephone numbers. Such subscribers tend to utilize their wireless telephone for outgoing calls, as needed, but disclose their wireless telephone numbers to a limited number of friends or family from whom they are willing to pay to receive calls. Calls from relatively unknown parties, e.g. solicitors and nuisance sources, thereby are avoided.

To overcome these issues and to encourage increased wireless usage, the wireless industry has developed a modified billing arrangement, commonly referred to as "Calling Party Pays." The intent of the service generally is to shift the air-time charges for calls to wireless telephones from the wireless subscribers to the callers. The calling party would pay for all network charges, in a manner more like that used in the normal landline service billing. A number of techniques have been developed for processing and billing call charges on a CPP basis.

For example, U.S. Pat. No. 5,353,331 to Emery et al. discloses an intelligent network type integrated wireless and wireline system for processing calls to and from a Personal Communication Service (PCS) subscriber's wireless handset via a home base station or a public cellular network. The service logic in the integrated service control point (ISCP) facilitates a variety of service enhancements to the wireless PCS service. One of the disclosed service enhancements is CPP. When the intelligent network functionality detects a call to the PCS customer's number, the network accesses a call processing record for that customer. Based on that record, the network screens the call based on the caller's identity. If the caller is not a recognized party, the ISCP database causes the network to play an announcement asking the caller if he or she is willing to pay all charges for the call. If the PCS subscriber is currently registered via a public wireless network switching office, the announcement would ask if the caller is willing to pay for the air-time necessary to complete the call via a wireless link. If the caller accepts the charges, the ISCP provides messages to a landline switch and/or to a mobile switch to instruct them to complete the call and to add charges for the air-time to the calling party's telephone bill.

U.S. Pat. No. 5,579,379 to D'Amico et al. discloses an AIN-based PCS service similar to the Emery arrangement. D'Amico adds further details to the CPP operations of that network. When a call directed to a mobile subscriber is detected, the call processing is stopped to determine if the CPP feature is in operation. At the same time, the network collects data regarding the calling party for analysis. If the called subscriber is using the CPP feature, the ISCP analyzes the caller data to determine if the caller is on a list of those individuals not required by the particular mobile service subscriber to pay for cellular charges. If the calling party does not fall in this category, the network provides an announcement to the calling party, asking the calling party whether or not the calling party is willing to pay for air-time necessary to complete the call. If the caller indicates willingness to pay for the air-time, the AIN network functionality obtains correct billing information, and the network completes the call and computes the cellular charges.

In systems such as those of Emery et al. and D'Amico et al., a landline carrier typically operates the intelligent network and performs the routing services, for certain aspects of the follow-me functionality of the PCS service. The carrier operating that network also performs the billing services related to the CPP feature. If the caller is a subscriber of the landline carrier, that carrier adds the air-time charges to the subscriber's normal telephone bill. The landline network carrier, rather than the cellular carrier, bears the responsibility of billing the calling party.

U.S. Pat. No. 5,557,664 to Burns et al. discloses use of a central database to determine whether to bill a calling party or a called party for charges for completion of a call to a mobile telephone. The illustrated system includes switches of a local exchange carrier network, switches of an interexchange carrier (IXC) network, one or more mobile switching centers and a service processor with announcement facilities, service logic and a database. If a calling station dials a telephone number of a party who subscribes to the CPP service, the local exchange switches extend the call to the originating IXC switch. The originating IXC switch provides a message, containing the dialed telephone number, to the service processor. The service processor retrieves a record corresponding to the dialed telephone number, and causes the announcement platform to provide an announcement regarding the pricing of the call through the network to the calling party. If the caller responds to the announcement by staying on the line to indicate acceptance of the charges, the service processor instructs the originating IXC switch to record billing information and notifies the billing system to charge the caller's account. The service processor also provides the mobile identification number (MIN) for completion of the call, to the originating IXC switch. The IXC network includes an indicator, preferably in the form of the dialed number, together with the MIN in the signaling to the mobile switching center, as an indication to inhibit normal billing for the call.

U.S. Pat. No. 5,473,667 to Neustein discloses a paging network. The system utilizes an automated attendant, which prompts a caller for desired information, to make a page. As part of the control of a paging operation, a central processor checks the profile of the paged party in the profile data base. The profile data enables the system to provide a number of enhanced services to paging service subscribers. In one of the enhanced services a paging party pays for the service on a per call basis. With the disclosed CPP type paging service, the caller calls the nearest central station and dials in the number of the pager he desires to page. The caller then enters his own billing number, for example his own telephone number or calling card number. If the billing number is valid, the system accepts an alphanumeric message or voice message from the caller and initiates paging of the called party's paging apparatus.

While all of the systems described above provide some level of effectiveness in billing for air-time to the calling party, each has certain practical limitations in actual use. When implemented in a real network, typically one carrier actually performs the calling party billing service for the wireless service provider. For example, using the Emery et al. type approach, a local exchange carrier might contract with a cellular carrier to perform the CPP billing. In the Burns et al. system the IXC performs the billing. In the Neustein system, at least some billing is done through a separate credit card or calling card company. All of the prior art systems have been subject to some leakage, because invariably, the company processing the bills can not efficiently bill every type of caller.

As a practical matter, the carrier performing the bill processing function can pass the CPP charges on only to those calling parties with whom that carrier has some type of existing billing arrangements. The local exchange carrier example actually provides the most effective solution, because on a very large percentage (typically 80–85%) of calls to the wireless telephone customers the callers are within the service area and are customers of the local exchange carrier. In such cases, the local exchange carrier can easily add the CPP charges to the normal telephone bills for the callers. However, some calls will not originate from customers of the billing carrier. In the local carrier example, that carrier has no billing relationship with parties who make incoming calls through an interexchange carrier, parties calling from payphones, parties calling from a hotel or motel or hospital, parties served by a competing local exchange carrier, parties calling from other wireless networks, etc. Calls that the billing carrier can not process to bill the charges to the calling party are considered "leakage" with respect to the CPP service.

The wireless carrier could elect not to complete calls that the billing carrier could not process for CPP service (leakage), and the carriers would set the call processing logic accordingly. However, the types of incoming calls that the network completes are then limited. This blockage of certain calls affects the attractiveness of the CPP service to wireless customers and sends a conflicting message to subscribers, particularly when the wireless carrier also is trying to encourage subscribers to widely distribute their wireless numbers to potential callers. To broaden usage in spite of leakage, some carriers have completed all incoming calls, and the wireless service carrier and/or the billing carrier has absorbed the leakage as a cost of doing business. The carrier(s) involved then must charge higher fees for the services or accept reduced profitability when compared to wireless services billed in the normal manner. Particularly from the point of view of the wireless carrier, who normally charges a per minute fee for all air-time, any completed but unbilled CPP calls essentially appear as lost revenues.

The other option for handling the problematic types of calls is to complete the calls to the subscriber but charge the air-time rates to the called subscriber. This approach is at odds with the purpose of the CPP service. The subscriber would not know if an incoming call receives the CPP treatment or accrues an air-time charge to the subscriber's own account. As a result, the wireless service subscribers would remain reluctant to distribute their wireless telephone numbers to large numbers of potential calling parties, who may call in such a manner as to still generate charges to the subscribers.

A need thus exists for systems and methodologies which enable one or more carriers to provide CPP wireless services, with little or no leakage, i.e. no class of calls that the carriers can not efficiently bill to the calling party. The above-identified copending application, Ser. No. 9/456,550 (now U.S. Pat. No. 6,405,028), and incorporated herein by reference, addresses the above stated needs and overcomes the stated problems by providing a network architecture and call processing logic, which enable CPP billing for calls to wireless subscribers including incoming calls that would otherwise leak through the billing operations of the principle carriers. A landline network routes incoming calls for a CPP subscriber to the wireless carrier's network. The landline network recognizes each call that is subject to CPP billing. If the carrier operating the landline network can bill a party associated with the calling station, that network routes the call to the mobile carrier's network and creates records for billing for the air-time. However, if the landline network can not bill a particular calling party, the landline network hands the call off to another switch. This switch provides access to one or more alternate billing facilities. The alternate billing facilities preferably include a clearinghouse and a credit card billing system. A database indicates whether it is possible to bill for the air-time through the clearinghouse. If so, the switch completes the call to the mobile carrier's network and creates appropriate records to enable the clearinghouse to bill the air-time to the party associated with the calling station. If the caller is not billable through the clearinghouse, the switch extends the call to the automated credit card billing system. The credit card system makes all necessary records to bill the air-time charges for the call and bills the time against the caller's credit card account.

This arrangement as disclosed, however, would not provide the CPP billing service in a call placed by a wireless station to another to another wireless station in the same region (system) because no provision presently exists for passing such a wireless call to the landline local exchange carrier (LEC). Instead, routing and completion of the call would transpire within the mobile system, thus bypassing the landline CPP system. While this system could be modified to send all mobile to mobile calls out to the LEC for screening, such a provision would create a great amount of wasted trunk traffic for calls directed to mobile destinations that do not subscribe to the CPP service. A screening process in which the centralized database is accessed to lookup a nonexistent record frequently would occur and the processing time taken to route a call to a non CPP subscriber would be unnecessarily lengthened.

Alternatively, provision of a CPP screening capability in a redundant database within the mobile system itself would have attendant drawbacks. Such a provision would incur additional expense to duplicate elements that still would be necessary in the landline environment to handle calls that originate from units other than the mobile system sets.

A further complication with either of these alternatives would arise in the handling of a call placed by a prepaid mobile caller to a mobile Call Party Pays subscriber set. Prepaid phone calling charge cards for pre-established amounts are commonly available for purchase at various retail vendors. A mobile phone subscriber can purchase a set amount of credit in advance of actual usage. The purchaser would then register with the system by calling in from the mobile phone to which the credit is to be applied. After successful registration, the system automatically applies calling charges for subsequent usage of the phone against the registered credit on a real time basis. As the balance decrements to established thresholds by real time call rating, announcements are transmitted informing the user that the credit limit is being approached. Any call still in progress when the total prepaid amount has been used is automatically terminated. The initiation of a prepaid mobile call to a CPP mobile destination poses a challenge in tracking air-time charges in real time for both calling and called party usage, which often are determined at different rates, and appropriately allocating all charges to the calling party.

The above-identified copending application, Ser. No. 09/467,144 (now U.S. Pat. No. 6,397,055), and incorporated herein by reference, addresses the above stated needs for handling CPP calls that originate from wireless sources. The wireless mobile network is provided with the ability to recognize that a called wireless station is a CPP subscriber. Upon such recognition at the outset of a call, the wireless mobile network will route the call to a landline facility to undertake interactive communication with the calling station to determine whether the caller will agree to pay for both the called party's air-time charges and the calling party's air-time charges for the call. Caller authorization may be obtained, for example, by voice communication or by DTMF entry. The landline facility can then access a database to determine if the carrier with which it is associated can provide billing functions with respect to the calling subscriber and, if so, activate such functions for a carrier entity so identified. If the carrier cannot handle billing for the call, the call may then be routed to a clearinghouse facility, which either can itself handle the billing functions, if such an arrangement with the calling party has been previously established, or communicate with the caller to authorize billing charges to a credit card. The clearinghouse facility or an alternative processor platform can rate the call charges that will be applied to the credit card bill. The call can then be completed to the called station through the wireless communication network while rating of air-time charges for both calling and called parties takes place. A link to a node is immediately established upon placement of a pre-paid mobile subscriber call, so that the existing prepaid credit balance for phone usage can be correlated on a real time basis for both calling party and called party air time usage. The link will be maintained for CPP calls after the caller has indicated to the landline facility that billing for the called party air-time charges is accepted. The node will perform real time rating for both calling and called party charges and provide notification to the caller when the caller's credit has been decremented to a predetermined level. Usage will be terminated upon exhaustion of the credit balance.

A need remains in the above described systems to provide the mobile system, in an efficient manner from a call processing perspective, the capability of handling calls to CPP subscriber stations from sources that are exempted from CPP application. At least two alternatives are available in which callers may gain exempt status. In a first alternative, the CPP mobile subscriber may establish a PIN to be used by any caller to avoid being responsible for the called party subscriber's air time charges. Those persons for whom the subscriber is willing to pay for incoming calls can be given the PIN by the subscriber. Upon placement of a call to the subscriber, the caller is given the opportunity to enter the PIN. If a valid PIN is entered, CPP exempt status is established. The system must change the accounting and billing process from charging the calling party for air time to charging the called party. In a second alternative, the CPP subscriber may formulate a "VIP" list of telephone numbers from which calls will be exempt from the CPP status. The list is stored in a landline system data base that is accessed upon placement of calls to the subscriber. A match of the calling telephone number with a number in the list thus will initiate a change in the accounting and billing process to charge the called party, rather than the calling party, for the called party's air time usage. Both alternatives may be implemented concurrently or individually.

Once a PIN has been verified or a calling number has been found to match a VIP listing, the use of a landline system for supervising CPP treatment is no longer necessary. Landline resources and trunks should not needlessly be tied up thereafter. A technique is needed to transition efficiently to conventional treatment of calls to mobile users.

An additional need exists to provide a CPP subscriber the capability of knowing that an incoming call is an exception to the CPP service. Such capability would give the subscriber an option of not answering if incurring charges is not desirable at that time. The subscriber could then feel more freedom to expand the base of individuals to whom the PIN will be divulged or will be added to the VIP listing. Mobile phones conventionally have the capability to display menu information, messages and caller ID information. Display of CPP exempt status of an incoming call would relieve the subscriber from otherwise having to remember whether a call from a particular individual is a CPP exempt call. Mindful of the exempt status, the subscriber can be aware to efficiently limit the time of engagement of the call.

SUMMARY OF THE INVENTION

The present invention fulfills the aforementioned needs, at least in part, by linking landline facilities to a wireless mobile network for calling party pays calls to mobile stations. In response to placement of a telephone call to a CPP subscriber station, a land line network data base is accessed to obtain a call processing record for the called station that is indicative that the called station subscribes to CPP service. Based on the call processing record, a determination is made as to whether the call is be accorded exception status from CPP service. If the call is to receive such exception status, a signaling message is transmitted to the mobile switching center (MSC) for the called subscriber station. The signaling message includes the calling station telephone number in altered form. The MSC, upon detection of the altered telephone number, effectively recognizes the call as a normal call. The MSC will complete the call to the called party and establish in the called party subscriber's billing record assessment of air time charges for the call to the called party. If the called mobile station is in the vicinity of a "visiting" MSC, the latter will receive the signaling message as relayed from the subscriber's MSC. If the call is not entitled to CPP exception status, the telephone number of the calling party will not be altered in the signaling message and the treatment for billing of the call preferably is handled as disclosed in either of the two above-identified pending applications.

The signaling message may preferably be an IAM message that is generated by the land line switch. Alteration of the telephone number in the content of the message may be accomplished in several ways. As it is desirable to maintain the final seven digits of the telephone number in its original form for purposes of accurate billing information, caller ID identification, etc., other changes to the IAM calling number field are contemplated. The IAM calling number field conventionally allocates twenty digits, of which ten digits normally are populated. In one preferred embodiment of the invention the number is altered for purposes of indication of CPP exempt status by added an eleventh digit to the IAM calling number field. For example, a "1" (or equivalent change) can be added in the digit before the ten digit calling telephone number. As an alternative, the area code of the calling number can be changed to a predesignated number or alphanumeric string that is dedicated to the purpose of CPP exempt status indication.

As the number of exception calls is expected to be significantly fewer than "non-exception" calls, calling telephone number alteration in the signaling message has been indicated for CPP exception situations. However, it is to be understood as being within the contemplated invention that the reverse implementation is available; that is, such alteration can instead be applied to calls that are to be treated as CPP service calls, while the exceptions can be signaled without such alteration. The MSC readily can be configured for either alternative. The altered number is transmitted to the called party for display as a caller ID number. Display of the altered number alone, or the addition of an additional identifying indication to the display, will alert the called party to the exception status of the incoming call.

The call processing record may contain a "VIP" listing of telephone numbers selected by the subscriber to be exempted from CPP status, and/or may contain a PIN which may be divulged by the subscriber to persons of his/her choice. Exempt status of a call is determined by a match of the calling telephone number with a telephone number of the VIP list or a match of input received from the calling party with the stored PIN.

Additional advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE PREFERRED EMBODIMENTS

Figure 1:
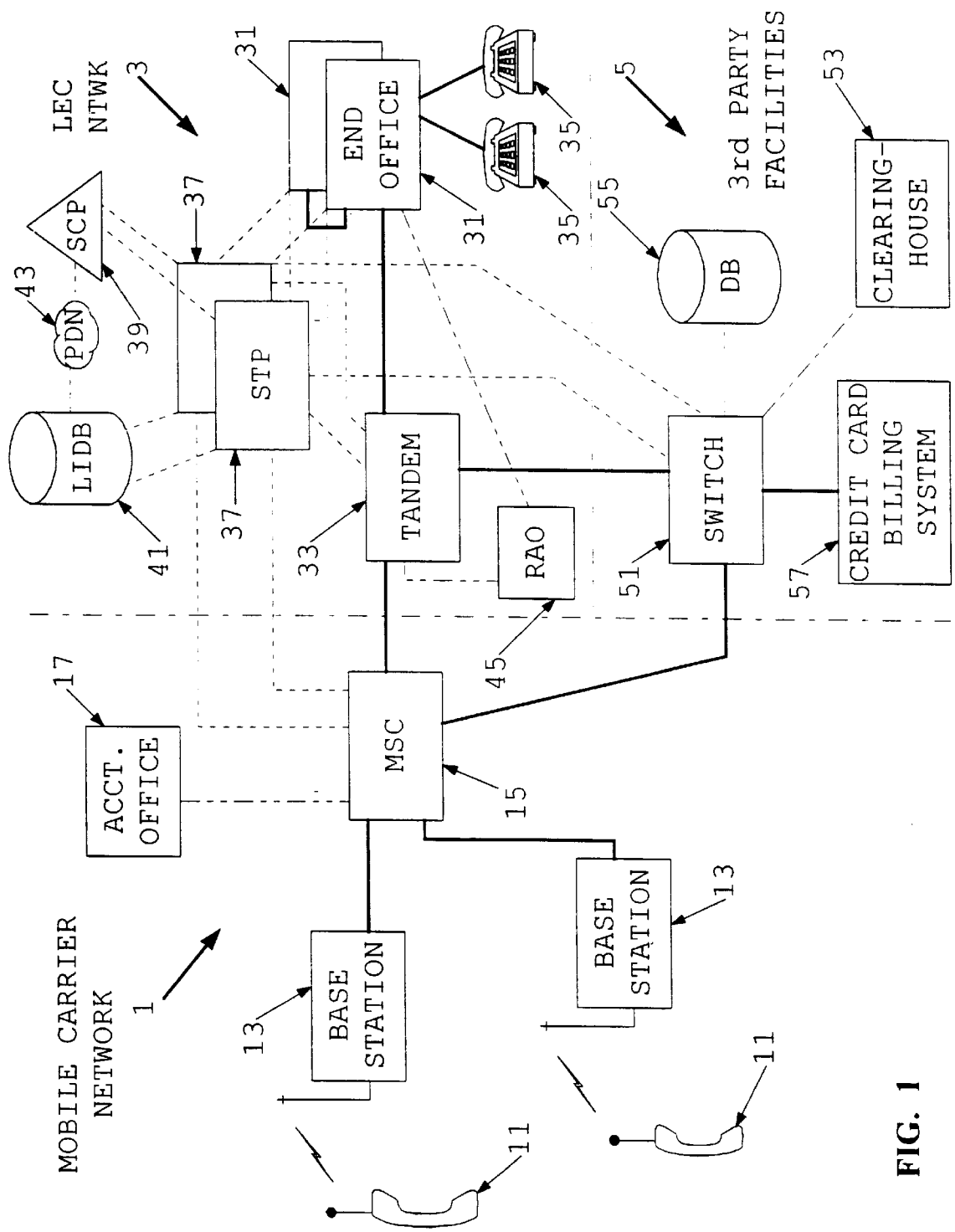
FIG. 1 is a simplified block diagram of a telecommunication system in accordance with the present invention.

The present invention utilizes features and functionalities in a wireless telephone network in conjunction with, at least in part, system architecture and call processing logic described in the previously identified copending applications, Ser. No. 9/456,550 (now U.S. Pat. No. 6,405, 028) and Ser. No. 09/467,144 (now U.S. Pat. No. 6,397, 055), the disclosures of which have been entirely incorporated herein. FIG. 1 is a block diagram related to that system architecture and described below in relation to the present invention.

For simplicity of illustration, the wireless carrier network 1 is shown as comprising a pair of base stations 13, connected to a mobile switching center (MSC) 15 that is interfaced and interconnected with landline networks. The wireless telephone network 1 preferably has the capability of providing analog, digital, or dual-mode network services. Wireless base stations 13 typically provide cellular or PCS radio coverage over the geographic area serviced by the network 1. Communication between mobile subscriber terminals, or handsets, 11 at different base stations can be completed through the wireless network path between base stations and MSC 15. The base stations 13 send and receive radio signals communicated to and from the compatible mobile stations 11. The base stations 13 also communicate over trunk circuits to a mobile switching center (MSC) 15. The MSC 15 controls the operations of the network 1 and provides selective switched connections. The illustrative drawing is representative of a wireless communication system that can provide service to a great number of subscribers 11, through a plurality of bases stations 13 and MSCs 15.

As part of normal operations, MSC 15 accumulates detailed call processing data for calls completed through the wireless network. The data for a completed call, for example, will include an identification of the mobile subscriber, the called or calling party telephone number for the other party to the call, the time of the call and the duration of the call. MSC 15 supplies this data to accounting office 17, preferably through an appropriate data communication link. A billing computer operating in the accounting office 17 can process call records from various MSCs in the wireless Network, to generate bills or invoices for delivery to the customers subscribing to the wireless carrier's services. The switched connections through the MSC 15 also provide selected call connections to the PSTN, for example to allow a user of mobile handset 11 to make a call to or receive a call from a landline telephone station.

Portions of a local exchange carrier network (LEC) 3 of the PSTN with which MSC closely interacts are represented in FIG. 1. The LEC telephone network includes a switched traffic network and a common channel signaling network that carries control signaling messages for the switched telephone traffic network. The telephone traffic network includes a number of end office type central office switching systems 31 and one or more tandem office type central office switching systems 33. Subscriber stations, depicted as telephones 35, are connected to the end office switches 31. Each end office type central office switch 31 provides switched telephone connections to and from local communication lines or other subscriber links coupled to end users stations or telephone sets 35. In the preferred implementation, the connections to the end offices 31 utilize telephone lines, and the switches 31, 33 are telephone type switches for providing landline communication. Of course, other communication links and other types of switches could be used, and the landline network 3 may be provisioned by a carrier other than the local exchange carrier.

Trunk circuits carry communication traffic between the end offices 31 and between the end offices 31 and the tandem switch 33. At least one tandem also provides trunk connections between the LEC network 3 and other carriers' networks. At least one trunk is linked between tandem 33 and MSC 15 of the mobile or wireless carrier's network 1. From the perspective of the network 3, all calls to or from the mobile stations go through tandem 33. Although not illustrated, tandem 33 may also provides connection to one or more interexchange carrier (IXC) networks.

The common channel interoffice signaling (CCIS) network portion of LEC 3 includes packet data links, illustrated as dotted lines, connected between appropriately equipped central office switching systems such as offices 31, 33 and a plurality of packet switches, termed Signaling Transfer Points (STPs) 37. To provide redundancy and thus a high degree of reliability, the STPs 37 typically are implemented as mated pairs of STPs. The CCIS network of the telephone system operates under an accepted signaling protocol standard, preferably Signaling System 7 (SS7). Each central office 31 or 33 has at least minimal SS7 signaling capability, which is conventionally referred to as a signaling point (SP) in reference to the SS7 network. The offices can exchange messages relating to call set-up and tear-down, typically in the format defined by the ISDN User Part (ISDN-UP) of SS7. At least some, and preferably all, of the central office switches 31 are programmed to recognize identified events or points in call (PICs) as advanced intelligent network (AIN) type service triggers. In response to a PIC or trigger, a central office 31 or 33 initiates a query through the CCIS signaling network to a control node or a database system, for instructions or information relating to AIN type services. Central office switching systems having full AIN trigger and query capability are referred to as Service Switching Points (SSPs). For purposes of the CPP service, at least the tandem 33 has full SSP capability. MSC 15 of the wireless carrier network 1 has signaling capability and connects by SS7 signaling links to the STP pair 37 of the LEC network 3. Although not shown, the MSC 15 link can include an IXC STP path.

The databases or other control nodes of the AIN used in networks such as the LEC network 3 include a number of different types of systems facilitating an increasingly sophisticated range of new services. One example of a control node is the Service Control Point (SCP) 39. Another common example of such an AIN database system is a Line Identification Data Base (LIDB) 41. Reference is again made to the earlier identified copending application for a more detailed description of the SCP 39. SCP 39 and LIDB 41 may communicate with each other through private data network (PDN) 43. PDN 43 may be a packet switched data network, such as the TCP/IP network.

The LIDB database 41 is a general-purpose computer system having a signaling link interface or connection to a pair of STPs 37. The LIDB computer system runs a database program to maintain a database of information relating to customer accounts and identifications. For example, a subscriber's entry in the LIDB database might include the subscriber's telephone number, a personal identification number for credit card billing purposes, and the subscriber's name and address. The LEC LIDB 41 may contain one such record for each of the LEC subscribers with a defined service area. The LIDB 41 also contains a record for each wireless subscriber who subscribes to the CPP service. The record for each such wireless subscriber may be accessed by means of the wireless subscriber's mobile telephone number.

In a normal call in the LEC network 3, an end office type switch 31 will detect an off-hook condition on the line and provide dial tone. The switch 31 identifies the line by its office equipment (OE) number and retrieves profile information corresponding to the OE number and off-hook line. If needed, the profile identifies the currently assigned telephone number. The switch in the end office 31 receives dialed digits and routes the call. The switch may route the call to another line serviced by that switch, or the switch may route the call over trunks and possibly through one or more tandem offices 33 to an office 31 that serves the called party's station or line.

AIN call processing involves a query and response procedure between an SSP capable switching office and a control node or a database system, such as the SCP 39 or the LIDB 41. An SSP capable switching office will initiate AIN involvement upon recognizing a triggering event at a PIC during call processing. The triggering event effects a query to the appropriate node 39 or 41 to obtain a return instruction to the switching system for continuing call processing. A variety of types of triggers are available. The SCP 39 provides instructions relating to AIN type services. The LIDB 41 typically provides subscriber account related information, for calling card billing services or for subscriber name display purposes in an enhanced caller ID application.

In a call placed to a telephone number of a wireless or mobile station 11 from a landline terminal 35 of LEC network 1, the serving end office 31 recognizes the NPA-NXX digits in the dialed number as those of a carrier served through the tandem 33. The end office 31 responds by routing the call to the tandem 33. In normal call processing, the tandem would route the call to the MSC 15 for completion to the destination station 11 without intervention by AIN triggering. If the called party is a CPP subscriber, however, AIN call processing, preferably triggered in the tandem 33, is relied upon for processing the call. The presence of an account record for a subscriber of the mobile carrier in the LIDB 41 serves as an indication that a particular subscriber telephone number of the wireless carrier has an associated subscription to the CPP service. The AIN call processing logic within the SCP 39 then makes several determinations, which are used to decide how to proceed. For example, the SCP logic recognizes if the particular caller agrees to pay the charges and whether or not the LEC can bill the calling party. If appropriate, the SCP logic also may determine whether or not an exception applies to the CPP billing treatment for the specific call.

In normal operation, a switch examines a customer's service request, typically the destination telephone number and, based on customer profile or service information, determines if there is a need for AMA recording for the call, for example if the call is a long-distance call. If the call involves signaling communication with an SCP, an instruction from the SCP can override the normal decision process regarding AMA recording. For CPP calls, the SCP 39 can instruct the tandem switch 33 to make AMA records to enable billing calling LEC customers for air-time charges of the called party. AMA records are transported to a regional accounting office (RAO) 45. While such records may be stored on data tapes that are physically transported, switches preferably are provided with an appropriate data transfer link to allow electronic communication of the records to the RAO 45. The generation and accumulation of AMA record details and the various components of the RAO are generally well known.

To provide for rating and billing of calls that would otherwise "leak" through the CPP operations of the networks 1 and 3, the system of FIG. 1 also utilizes certain additional facilities that may be provided by one or more third parties, collectively identified by the network portion 5. The third party billing entity network provides access to at least two billing alternatives for CPP calls that can not be billed by the LEC. In one alternative, billing functions are handled through a clearinghouse for non LEC subscriber callers who have pre-established relationships with the clearinghouse. The other alternative provides automated credit card processing, wherein interactive communication is conducted to obtain from the caller identity of a credit card account and authorization to bill thereto air-time charges for the called party. The functions of these alternatives and the elements of the third party billing network may be under complete or partial control of the clearinghouse.

Switch 51 of the third party network is generally similar in structure and operation to the switches of the LEC network 3. The switch 51 has normal telephone switching capabilities. The switch 51 may also have rating and data recording capabilities, which might be provided for example by AMA recording equipment in a telephone switching office. The switch 51 provides AMA records of certain CPP calls to a clearinghouse 53, for bill processing. Switch 51 connects through trunk circuits to both the LEC tandem 33 and the MSC 15. The switch 51 also communicates call set-up signaling with both the LEC tandem 33 and the MSC 15. The signaling may be in-band, but preferably uses SS7 communications, for example, through one or more STPs 37 of the LEC and/or another CCIS service provider (not shown).

The third party facilities 5 also include a database (DB) 55, which may be similar to the LIDB, but maintained by the third party. The database DB identifies all customers that the third party can bill through the clearinghouse 53. The switch 51 and database DB 55 may be implemented by a central office switching system and an intelligent network database system communicating via SS7, similar to the systems of the LEC, for example if the third party service provider is another carrier offering its own variety of telecommunication services. Alternatively, the third party may provide only the switch and database together with data communications to the clearinghouse. In such a case the third party may use other implementations of the switch 51 and database DB 55, such as an integrated unit with both telephone switching and database look-up capabilities.

In a CPP call, when the LEC tandem 33 routes the call to the switch 51, the systems of LEC network 3 already have determined that the calling party has agreed to pay the air-time charges but the LEC can not bill the particular subscriber associated with the calling station. The switch 51 executes a routine to access the database 55 to determine if the third party can bill the calling station subscriber via the clearinghouse. If so, the switch 51 completes the call through the MSC. At this time, the switch makes the AMA records for later delivery to the clearinghouse system 53 and provides the signaling to the MSC 15 to suppress its normal data reporting regarding billing.

If the call can not be billed through the clearinghouse, automated credit card billing system 57 is invoked. The switch 51 provides selective call connections, for voice grade communications with callers, to the credit card billing system 57. The system 57 is a standard system for providing voice prompts to callers and collecting dialed digit or spoken information, for example, to obtain a credit card number from a caller. The system may also obtain expiration date and a PIN relating to the caller's credit card account. The system 57 communicates with existing credit card company equipment to verify account status and apply accrued charges to identified credit card accounts. The system 57 also includes telephone call rating equipment, to time telephone calls processed through the system 57 and calculate costs for such calls, including the billable air-time charges. The system 57 remains in the call connection in order to time rate the call. The switch 51 does not make AMA records, but signals the MSC 15 to suppress its normal data reporting regarding billing. The billing system 57 accumulates the necessary records regarding the call and charges appropriate fees to the caller's credit card account.

Calls placed to a telephone number of a wireless or mobile station from a calling wireless station in a mobile system conventionally are handled internally. That is, call routing remains within the system, apart from the LEC PSTN. This conventional routing process, as previously discussed, does not satisfactorily provide for a CPP call from a mobile caller to a mobile called party. In accordance with the present invention, the architecture of FIG. 1 is utilized to overcome this deficiency. The wireless network does not require redundant duplication of landline facilities. Instead, the landline network, illustrated in FIG. 1, is accessed through recognition in the wireless network that a mobile call is being placed to a CPP mobile subscriber.

Figure 2:
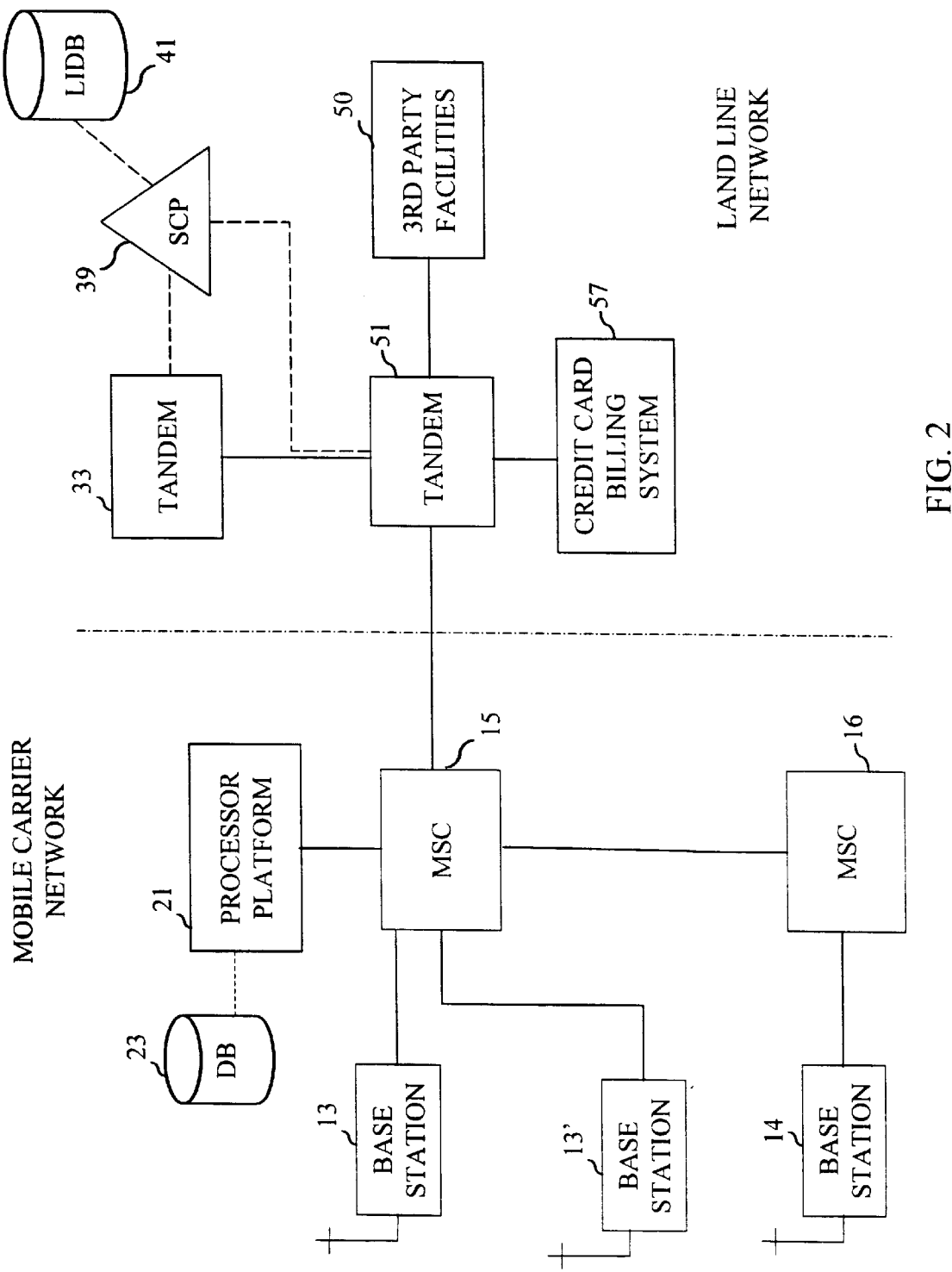
FIG. 2 is a partial block diagram of landline network and mobile network architecture in accordance with the present invention.

FIG. 2 is a partial block diagram of landline network and mobile network architecture that can provide for implementation of CPP service for calls originating from prepaid mobile users and for calls in which a mobile user may be in an area served by a "visiting" mobile switching center. Elements that are common with FIG. 1 are labelled with the same reference numerals. The mobile carrier network is represented as an expanded coverage area, respective portions of which are serviced by MSCs 15 and 16. The interconnection between these MSCs is represented by a direct trunk connection, although the two switching centers in practice can be linked by any combination of wire and/or wireless connections. The switching centers have signaling communication capability with each other and the landline network. Base stations 13 and 13' are each connected to, and served by, MSC 15. Similarly, MSC 16 is connected to and serves the wireless transmission area of base station 14. Any of these base stations is capable of completing a wireless link with a compatible mobile set that may be a "home" station or "visiting" station.

Processor platform (node) 21 is connected by a trunk group to mobile switching unit 15. Database 23, which serves node 21, is connected thereto by a data communication path. Database 23 contains records for all registered prepaid customers. The records store credit available and air-time rates. Processor platform 21 and database 23 may serve MSC 16 and other mobile switching centers that are not illustrated. Reference is made to copending application Ser. No. 09/467,144 for a more detailed discussion of CPP service implementation for prepaid mobile calls.

MSC 15 is shown connected by at least one trunk to tandem 51 of the landline network. It is to be understood that this representation is merely illustrative, as in practice any one or more mobile switching centers may be so connected to a landline tandem. Tandem 51 is shown generally as a landline network tandem and may be part of the local carrier network or part of a different landline network interconnected therewith. Only by way of example, FIG. 1 illustrates the LEC tandem 33 connected to MSC 15 and an additional connection between MSC 15 and third party switch 51. For ease of illustration, the third party facilities are represented by block 50. It is to be understood that additional detailed network architecture, including the signaling arrangement such as shown in FIG. 1, is provided but not illustrated as it is not necessary for understanding of the present invention.

Figure 3:
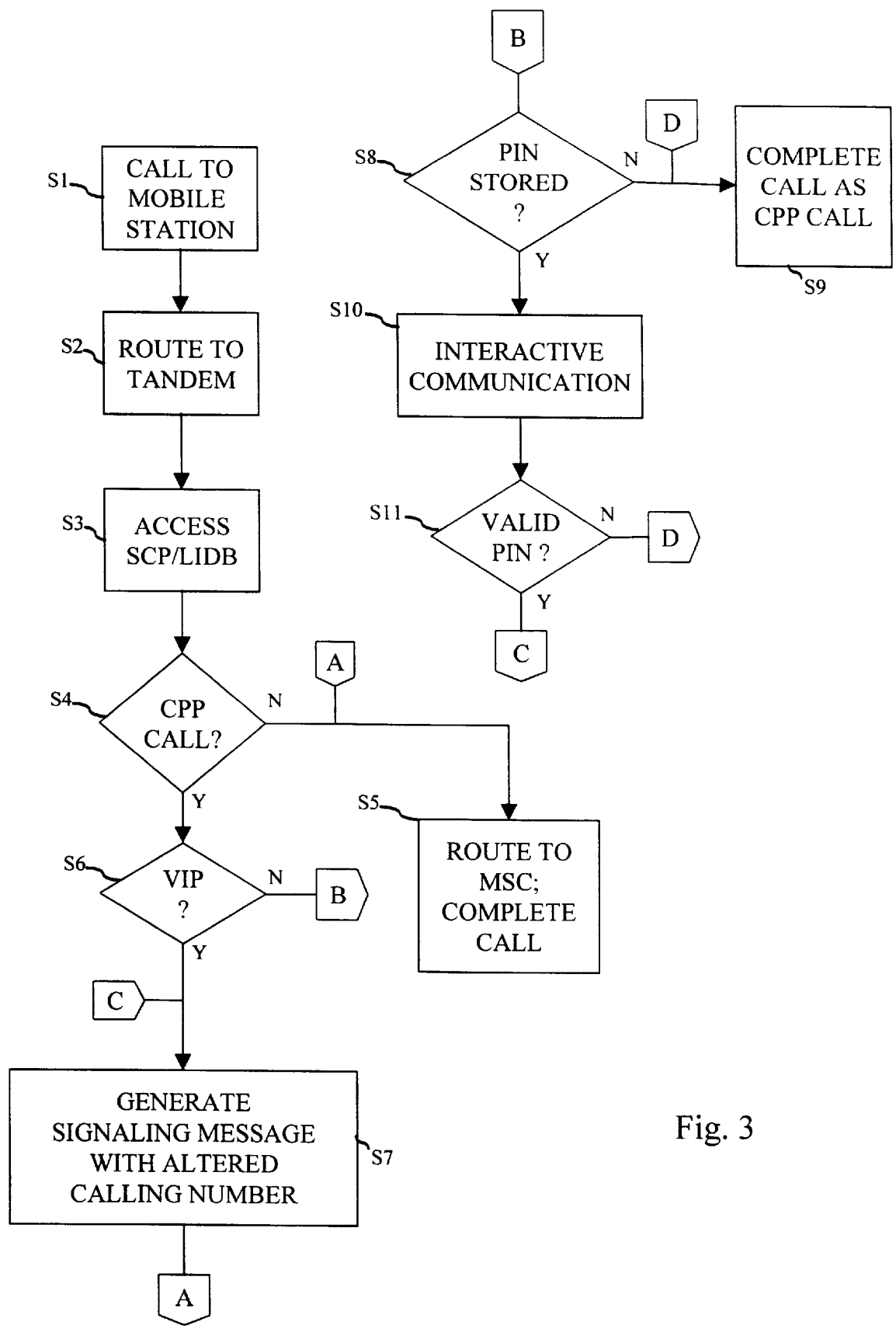
FIG. 3 is a simplified flow chart illustrating the processing of a call placed to a mobile unit destination in accordance with the present invention

FIG. 3 is a simplified flow chart illustrating the processing of a call placed to a mobile unit destination in accordance with the present invention. At step S1 a call is initiated when a caller, for example, at landline station 35 in FIG. 1, takes the station handset off-hook and dials the mobile station telephone number. Alternatively, a call can be placed from another mobile station 11. For the landline originated call, the end office 31 serving the calling station routes the call to the tandem 33 at S2. As part of this routing, the end office signals the tandem 33. The ISDN-UP call set-up signaling to the tandem includes a variety of information, such as the calling party telephone number and the dialed destination number. In the case of a call originated from a mobile unit, MSC 15 will recognize that the called destination represents a CPP subscriber, preferably in the manner disclosed in copending application Ser. No. 09/467,144 and rout the call in similar fashion to the landline tandem.

The tandem switch recognizes that the call is one intended for a mobile station 11, for example from the NPA-NXX digits of the dialed number and that a trigger has been set. A Transaction Capabilities Applications Part (TCAP) query message is then launched through one or more of the STP(s) 37 to the relevant LIDB and SCP databases at step S3. At step S4, a decision is made from called party information accessed from the database as to whether the call has been placed to a CPP service subscriber. If the destination station is not identified as a CPP service subscriber, the call is routed to the MSC for completion of the call in the normal manner for mobile destination calls at step S5. Conventional treatment of such calls involves routing the call to an MSC serving the area in which the mobile set is located, whether the home or visiting MSC, completing the routing path through a base station with calling party information supplied for display on the mobile set, and creating and maintaining charge accounting for billing if the call is answered.

Confirmation that the called party station is a CPP subscriber in step S4 will have included identification of a record for the subscriber in either (or both) of the LIDB or SCP database. At step S6, the retrieved subscriber record is examined to determine whether it contains a "VIP" list of telephone numbers of stations from which CPP treatment is not to be applied for calls to the subscriber. If a VIP has been identified it is compared with the telephone number of the calling party. A match of the numbers characterizes the call as being an exception to CPP service application. The SCP (or LIDB) then formulates a TCAP call control type response message or equivalent, including the appropriate instructions regarding bypassing the Calling Party Pays processing system, and returns that response message to the tandem office via the SS7 network.

The tandem switch, in response to the received instructions, will generate an IAM signaling message at step S7 in order to complete the call as a normal mobile destination call, exempt from CPP status. The tandem then formulates appropriate signaling for completing routing of the call, including generation of an IAM signaling message to be transmitted to the MSC. The calling party number field of the IAM message will include an altered version of the calling party number, while retaining the final seven digits necessary for identifying the calling party subscriber. The alteration of the calling number preferably may be implemented by either changing the area code (first three digits of the ten digit calling party telephone number) or inserting an eleventh digit. As the IAM message format conventionally allocates twenty digits to the calling number field, a particular digit location can be pre-established for this purpose. Similarly, an area code descriptor that is not in actual use can be established as an identifier of CPP exempt status. The call, with appropriate signaling processing is then routed from the tandem to the MSC to complete the call. The MSC, having been set to recognize the significance of calling number alteration will proceed as at step S5, described above. Caller identification information sent for display at the called party unit may reproduce the altered number and/or may include an CPP exception indication message provided by the MSC. The called party will thus be alerted upon receiving the call to the fact that the air time charges will be billed to the called party.

If there has been no match of the calling party number with a "VIP" number listed in the called party record at step S6, the record is searched for a stored PIN number that is indicative of CPP exception status at step S8. If no PIN is found, the call is not exempt from CPP treatment.

Such treatment is described in detail in the above identified copending applications and is represented generally in the flow chart as step S9. If a PIN has been identified in the called party record in step S8, a TCAP call control type response message or equivalent is formulated with processing instructions and sent to the tandem via the SS7 network at step S10. Interactive communication with the calling party is then undertaken to provide the opportunity to enter a valid PIN. The tandem will thus connect the call to an internal announcement platform (not separately shown), to provide an announcement describing the CPP service and an audible prompt. The platform preferably is capable of speech recognition so that the caller may respond by speech or DTMF input. Alternatively, the tandem could connect the call to an external platform, such as an intelligent peripheral, to provide the interactive session.

At step S11, the response of the caller is evaluated to determine whether a valid PIN has been submitted. A valid response is determined if matching digits (or alphanumeric characters) are spoken or entered as DTMF input. Other verbal response by the caller, or lack of any response during a set time-out period, is taken as a lack of a valid PIN entry. Of course, entry of an incorrect PIN can be taken immediately as a PIN entry failure or the caller may be given one or more additional opportunities to enter a correct PIN. In no valid PIN determination has been made at step S11, the call will be treated as a CPP call, as described above with respect to step S9. If a valid PIN has been determined in step S11, bypass of the CPP processing system is in order and the flow chart branches to processing step S7 to complete the call as described above.

While the foregoing has described what are considered to be preferred embodiments of the invention, it is understood that various modifications may be made therein and that the invention may be implemented in various forms and embodiments, and that it may be applied in numerous applications, only some of which have been described herein. Those skilled in the art will recognize that the present invention admits of a number of modifications, within the spirit and scope of the inventive concepts. For example, the interactive session in which a PIN announcement is given can include further options to the caller to accept or reject CPP status and completion of the call if the caller is not in possession of the PIN. It is intended by the following claims to claim all such modifications and variations which fall within the true scope of the invention.

What is claimed:

1. A method for processing a telephone call placed from a calling station having a telephone number associated therewith to a mobile station Calling Party Pays (CPP) service subscriber, said method comprising the steps of:

routing said call to a land line network system switch;

determining whether the call is an exception to CPP service status;

in response to an exception determination in said determining step, transmitting a signaling message to a mobile switching center (MSC) associated with said called mobile station, said message including the calling station telephone number in altered form;

detecting at said MSC of the altered telephone number received in said transmitting step; and in response to detection by said MSC of the altered telephone number, completing the call to the called party and billing the called party for air time charges.

2. A method as recited in claim 1, wherein said MSC is a home MSC for said mobile station.

3. A method as recited in claim 1, wherein said MSC is a visiting MSC for said mobile station and said signaling message is relayed to said visiting MSC via a home MSC for said mobile station in said transmitting step.

4. A method as recited in claim 1, wherein said completing step comprises accessing a billing record for said mobile station and entering the call for rating of air time charges to said mobile station.

5. A method as recited in claim 1, wherein said determining step comprises:

accessing a record associated with the CPP subscriber in a land line network data base, said record containing a listing of telephone numbers that are to be excluded CPP status for calls to said subscriber; and comparing the telephone number of the calling station with a telephone number listed in the data base record;

wherein a match of the telephone number with the listing is indicative of an exception determination.

6. A method as recited in claim 1, wherein said determining step comprises:

accessing a record associated with the CPP subscriber in a land line network data base, said record containing a PIN for identifying calls to said subscriber that are to be excluded CPP status;

communicating with said calling station for receiving a PIN input therefrom; and comparing a PIN input received from said calling station with a PIN stored in said land line network data base record;

wherein a match in said comparing step is indicative of an exception determination.

7. A method as recited in claim 1 wherein said signaling message is an IAM message generated by said land line switch and the altered form of the telephone number is the inclusion of an added digit.

8. A method as recited in claim 1, wherein said signaling message is an IAM message generated by said land line switch and the area code of the telephone number is changed to an alphanumeric string pre-designated as an indicator of CPP exception status.

9. A method as recited in claim 1, further comprising:

transmitting the altered telephone number of the calling station to said called mobile station to be displayed as caller ID information;

wherein the called party is apprised that the call is an exception to CPP service.

10. For a wireless telephone network including a signaling capable mobile switching center (MSC) for interfacing a wireless base station with a land line network, a method for processing a telephone call placed from a calling telephone station having an associated telephone number to a wireless telephone called station associated with said (MSC), said method comprising the steps of:

in response to initiation of said telephone call by said calling station, accessing a data base associated with said land line network to obtain a call processing record for the called station that is indicative that said called station subscribes to calling party pays billing (CPP) service;

based on said call processing record, determining whether the call is excepted from CPP status;

if the call is established as a CPP status exception in said determining step, transmitting a signaling message to said (MSC), said signaling message including the calling station telephone number in altered form; and in response to detection by said MSC of the altered telephone number, completing the call to the called party and billing the called party for air time charges.

11. A method as recited in claim 10, wherein said determining step comprises:

comparing the telephone number of the calling station with the call processing record for a match to a telephone number listed therein, said match being indicative of an exception determination.

12. A method as recited in claim 10, wherein said call processing record contains a PIN for identifying calls to said subscriber that are to be excluded CPP status; and said determining step comprises:

communicating with said calling station for receiving a PIN input therefrom; and comparing a PIN input received from said calling station with a PIN contained in call processing record;

wherein a match in said comparing step is indicative of an exception determination.

13. A method as recited in claim 10, further comprising the steps of:

if the call is not established as a CPP status exception in said determining step, transmitting a signaling message to said mobile switching center, said signaling message including the calling station telephone number in unaltered form; and in response to detection by said MSC of the unaltered telephone number, completing the call to the called party and billing the calling party for air time charges for the called party.

14. A method for processing a telephone call placed from a calling station to a mobile station of a Calling Party Pays (CPP) service subscriber, said method comprising the steps of:

routing said call to a land line network system switch;

determining whether the call is an exception to CPP service status;

formulating a signaling message related to said call including a calling number field, wherein in response to an exception determination in said determining step, the step of formulating includes setting a value in the calling number field of the signaling message to indicate the determination of the exception;

transmitting the signaling message to a mobile switching center (MSC) associated with the called mobile station;

detecting at said MSC of the set value in the calling number field of the signaling message; and in response to the detection by said MSC of the set value, completing the call to the called party and billing said subscriber for air time charges.

15. A method as recited in claim, 14, wherein the step of determining comprises:

accessing a data base associated with said land line network to obtain a call processing record for the called mobile station that is indicative that said called mobile station subscribes to the CPP service; and based on said call processing record, determining whether the call is excepted from CPP status.

16. A method as recited in claim 14, wherein:

the step of completing includes transmitting the set value from the calling number field of the signaling message to said called mobile station to be displayed as caller ID information; and display of the set value apprises the called party that the call is an exception to CPP service.

17. A method as recited in claim 16, wherein the set value from the calling number field comprises an altered version of a telephone number of the calling station.

18. A method as recited in claim 17, wherein the altered version of telephone number of the calling station comprises a first portion indicating that the call is an exception to CPP service and a second portion comprising a plurality of digits from the telephone number of the calling station.

19. A method for processing a telephone call placed from a calling station to a mobile station of a Calling Party Pays (CPP) service subscriber, said method comprising the steps of:

routing said call to a land line network system switch;

determining whether or not the call is an exception to CPP service status;

formulating a signaling message related to said call, including a calling number field;

wherein if said determining step results in an exception determination, the step of formulating includes setting a value in the calling number field of the signaling message to indicate the determination of the exception;

wherein if said determining step results in no exception determination, the step of formulating includes populating the calling number field with a telephone number of the calling station;

transmitting the signaling message to a mobile switching center (MSC) associated with the called mobile station;

completing the call to the called mobile station;

if the calling number field of the signaling message contains the telephone number associated with the calling station, billing the calling party for air time charges for the called party; and if the calling number field of the signaling message contains the set value, billing the subscriber for air time charges.

20. A method as recited in claim 19, wherein the set value comprises an altered version of the telephone number of the calling station.

21. A method as recited in claim 20, wherein the altered version of the telephone number of the calling station comprises a first portion indicating that the call is an exception to CPP service and a second portion comprising a plurality of digits from the telephone number of the calling station.

* * * * *